US009588532B2

(12) United States Patent
Rahimi et al.

(10) Patent No.: US 9,588,532 B2
(45) Date of Patent: Mar. 7, 2017

(54) VOLTAGE REGULATOR HAVING AN EMULATED RIPPLE GENERATOR

(71) Applicant: Infineon Technologies Americas Corp., El Segundo, CA (US)

(72) Inventors: Amir M. Rahimi, Irvine, CA (US); Parviz Parto, Laguna Niguel, CA (US); Peyman Asadi, College Station, TX (US)

(73) Assignee: Infineon Technologies Americas Corp., El Segundo, CA (US)

( * ) Notice: Subject to any disclaimer, the term of this patent is extended or adjusted under 35 U.S.C. 154(b) by 479 days.

(21) Appl. No.: 13/746,002

(22) Filed: Jan. 21, 2013

(65) Prior Publication Data
US 2013/0249508 A1    Sep. 26, 2013

Related U.S. Application Data

(60) Provisional application No. 61/615,767, filed on Mar. 26, 2012.

(51) Int. Cl.
| | | |
|---|---|---|
| *H02M 3/156* | (2006.01) | |
| *G05F 1/625* | (2006.01) | |
| *H02M 1/14* | (2006.01) | |
| *H02M 3/158* | (2006.01) | |

(52) U.S. Cl.
CPC .............. *G05F 1/625* (2013.01); *H02M 1/14* (2013.01); *H02M 3/156* (2013.01); *H02M 3/1588* (2013.01); *Y02B 70/1466* (2013.01)

(58) Field of Classification Search
CPC ... G05F 1/00; G05F 1/10; G05F 1/625; G05F 1/46; G05F 1/618; H02M 2001/0025
See application file for complete search history.

(56) References Cited

U.S. PATENT DOCUMENTS

| | | | | |
|---|---|---|---|---|
| 3,327,202 A | * | 6/1967 | Mills .............................. | 323/288 |
| 3,329,887 A | * | 7/1967 | Schaeve ................. | G05D 23/24 |
| | | | | 219/494 |
| 3,474,289 A | * | 10/1969 | Stone ........................ | H05H 1/36 |
| | | | | 250/554 |
| 3,678,937 A | * | 7/1972 | Cole ......................... | A61N 1/37 |
| | | | | 607/9 |
| 3,795,247 A | * | 3/1974 | Thaler ..................... | A61N 1/365 |
| | | | | 327/227 |

(Continued)

*Primary Examiner* — Timothy J Dole
*Assistant Examiner* — Yusef Ahmed
(74) *Attorney, Agent, or Firm* — Shumaker & Sieffert, P.A.

(57) ABSTRACT

According to an exemplary implementation, a voltage regulator includes an emulated ripple generator. The emulated ripple generator includes a high side switch configured to control charging of an emulated ripple. The emulated ripple generator further includes a low side switch configured to control discharging of the emulated ripple. The high side switch and the low side switch are configured to control the charging and the discharging such that the emulated ripple is substantially in-phase with an inductor current of the voltage regulator. The high side switch can be configured to control the charging by selectively enabling a high side current source. Furthermore, the low side switch can be configured to control the discharging by selectively enabling a low side current source.

18 Claims, 3 Drawing Sheets

(56) References Cited

U.S. PATENT DOCUMENTS

| | | | | |
|---|---|---|---|---|
| 3,888,260 | A | * | 6/1975 | Fischell .................. A61N 1/365 607/29 |
| 3,978,838 | A | * | 9/1976 | Oister .................... F02P 3/0884 123/604 |
| 4,163,968 | A | * | 8/1979 | Davis ...................... G08B 17/00 340/510 |
| 4,412,212 | A | * | 10/1983 | Kolegraff ................ A01F 29/16 241/37 |
| 5,747,976 | A | | 5/1998 | Wong |
| 5,949,264 | A | * | 9/1999 | Lo .......................... H03D 13/004 327/148 |
| 6,377,032 | B1 | * | 4/2002 | Andruzzi ............ H02M 3/1588 323/224 |
| 6,445,233 | B1 | * | 9/2002 | Pinai et al. .................... 327/159 |
| 6,583,610 | B2 | | 6/2003 | Groom |
| 7,019,504 | B2 | | 3/2006 | Pullen |
| 7,058,373 | B2 | * | 6/2006 | Grigore .................... H03C 5/00 323/266 |
| 7,135,841 | B1 | * | 11/2006 | Tomiyoshi et al. ........... 323/224 |
| 7,180,757 | B2 | * | 2/2007 | Chen ........................ H02M 1/36 323/901 |
| 7,342,385 | B2 | * | 3/2008 | Capodivacca et al. ....... 323/272 |
| 7,372,241 | B1 | * | 5/2008 | Tomiyoshi .................... 323/288 |
| 7,391,190 | B1 | * | 6/2008 | Rajagopalan ................. 323/271 |
| 7,567,067 | B2 | * | 7/2009 | Lee ........................ H02M 3/156 315/224 |
| 7,714,547 | B2 | | 5/2010 | Fogg |
| 7,936,160 | B1 | * | 5/2011 | Sheehan ....................... 323/285 |
| RE43,414 | E | * | 5/2012 | Walters ................. H02M 3/156 323/282 |
| 8,441,235 | B2 | * | 5/2013 | Shi ........................ H02J 7/0073 320/137 |
| 8,860,387 | B2 | * | 10/2014 | Kobayashi .................... 323/259 |
| 8,860,396 | B2 | * | 10/2014 | Giuliano ...................... 323/288 |
| 9,065,337 | B2 | * | 6/2015 | Tanabe ................ H02M 3/1582 |
| 9,071,125 | B2 | * | 6/2015 | Michishita .............. H02M 7/04 |
| 9,110,489 | B2 | * | 8/2015 | Svorc .................... H02M 3/156 |
| 2002/0125872 | A1 | | 9/2002 | Groom |
| 2004/0036459 | A1 | * | 2/2004 | Wiktor ................ H02M 3/1588 323/282 |
| 2005/0194947 | A1 | * | 9/2005 | Murai et al. .................. 323/265 |
| 2005/0286269 | A1 | | 12/2005 | Groom |
| 2006/0061342 | A1 | * | 3/2006 | Bernacchia et al. .......... 323/282 |
| 2006/0220629 | A1 | * | 10/2006 | Saito et al. ................... 323/282 |
| 2006/0284609 | A1 | | 12/2006 | Weng |
| 2007/0120547 | A1 | * | 5/2007 | Tateishi ................ H02M 3/158 323/282 |
| 2007/0222423 | A1 | * | 9/2007 | Chen .................... H02M 3/156 323/283 |
| 2008/0030181 | A1 | * | 2/2008 | Liu et al. ...................... 323/283 |
| 2008/0049473 | A1 | * | 2/2008 | Sugahara et al. ............... 363/89 |
| 2008/0088292 | A1 | | 4/2008 | Stoichita |
| 2009/0116280 | A1 | * | 5/2009 | Parkinson .......... G11C 13/0004 365/163 |
| 2009/0140711 | A1 | * | 6/2009 | Philbrick et al. ............. 323/285 |
| 2010/0019749 | A1 | | 1/2010 | Katsuya |
| 2010/0134080 | A1 | | 6/2010 | Ouyang |
| 2010/0181983 | A1 | * | 7/2010 | Ouyang ................ H02M 3/156 323/283 |
| 2011/0089915 | A1 | * | 4/2011 | Qiu ....................... H02M 3/156 323/271 |
| 2011/0089925 | A1 | * | 4/2011 | Ishida et al. .................. 323/285 |
| 2011/0121806 | A1 | * | 5/2011 | Garrett et al. ................. 323/282 |
| 2011/0215780 | A1 | * | 9/2011 | Lee et al. ..................... 323/282 |
| 2011/0267015 | A1 | * | 11/2011 | Lu et al. ...................... 323/235 |
| 2011/0304308 | A1 | * | 12/2011 | Wan et al. .................... 323/288 |
| 2011/0316508 | A1 | * | 12/2011 | Cheng .................... H02M 1/14 323/282 |
| 2012/0001603 | A1 | * | 1/2012 | Ouyang et al. ................ 323/271 |
| 2012/0026762 | A1 | * | 2/2012 | Nguyen et al. .................. 363/49 |
| 2012/0049826 | A1 | * | 3/2012 | Hsu et al. ..................... 323/284 |
| 2012/0081094 | A1 | * | 4/2012 | Luo ....................... H02M 3/156 323/284 |
| 2012/0146606 | A1 | * | 6/2012 | Li et al. ....................... 323/283 |
| 2012/0212204 | A1 | * | 8/2012 | Philbrick et al. ............. 323/284 |
| 2012/0217941 | A1 | * | 8/2012 | Chen .................... H02M 3/156 323/271 |
| 2012/0235659 | A1 | * | 9/2012 | Wen et al. .................... 323/282 |
| 2012/0249093 | A1 | * | 10/2012 | Grbo et al. ................... 323/234 |
| 2012/0249102 | A1 | * | 10/2012 | Cuk ........................... 323/282 |
| 2012/0274296 | A1 | * | 11/2012 | Higuchi ................ H02M 3/156 323/282 |
| 2012/0274301 | A1 | * | 11/2012 | Nakashima ................... 323/284 |
| 2013/0002223 | A1 | * | 1/2013 | Xi .............................. 323/284 |
| 2013/0063102 | A1 | * | 3/2013 | Chen .......................... 323/234 |
| 2013/0099761 | A1 | * | 4/2013 | Dong .................... H02M 3/156 323/271 |
| 2013/0163300 | A1 | * | 6/2013 | Zhao et al. .................... 363/89 |
| 2013/0207630 | A1 | * | 8/2013 | Rahardjo ............... H02M 3/156 323/283 |
| 2014/0049235 | A1 | * | 2/2014 | Li et al. ....................... 323/271 |
| 2014/0084884 | A1 | * | 3/2014 | Lee ........................... 323/271 |
| 2014/0097881 | A1 | * | 4/2014 | Lynch et al. .................. 327/312 |
| 2014/0159689 | A1 | * | 6/2014 | Chen .................... H02M 3/156 323/282 |
| 2014/0253060 | A1 | * | 9/2014 | Lin .......................... G05F 1/10 323/271 |

\* cited by examiner

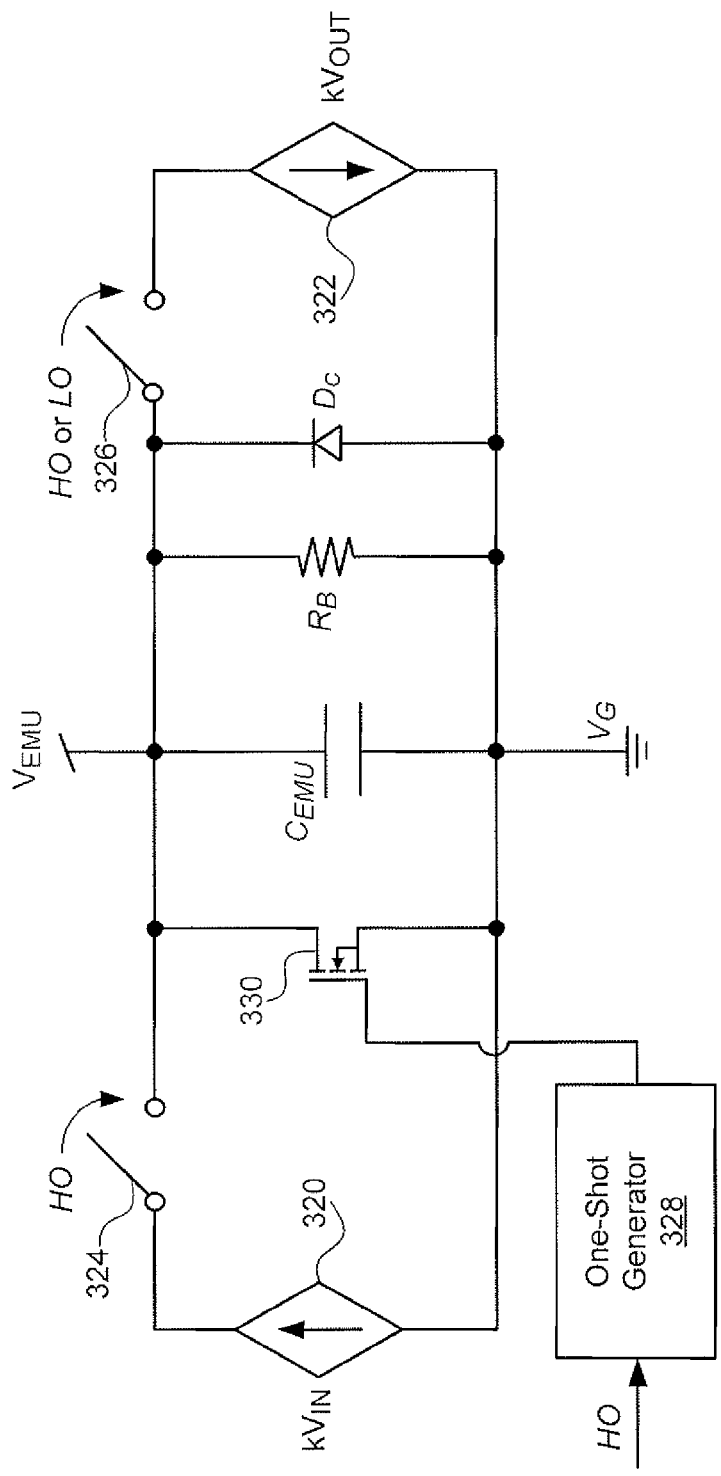

VOLTAGE REGULATOR HAVING AN EMULATED RIPPLE GENERATOR

The present application claims the benefit of and priority to a pending provisional patent application entitled "Ripple Regulator with an Emulated Ramp Generator," Ser. No. 61/615,767 filed on Mar. 26, 2012. The disclosure in that pending provisional application is hereby incorporated fully by reference into the present application.

BACKGROUND

A voltage regulator can typically include an output filter having an output inductor for connection to a load and an output capacitor in parallel with the load. The output inductor is connected to and disconnected from an input voltage by switching high side and low side power transistors to regulate an output voltage of the voltage regulator. The switching induces a ripple in inductor current of the voltage regulator, which manifests itself in the output voltage due, principally, to equivalent series resistance (ESR) in the output capacitor.

In many applications, the ripple in the inductor current constitutes noise which must be minimized. However, certain voltage regulator designs regulate the output voltage based on the ripple in the output voltage. Some of these voltage regulator designs may not operate stably when the ripple in the output voltage is too small. Others may operate stably, but require a relatively constant series resistance of the output inductor as well as additional components. These additional components must be external to an integrated circuit that houses remaining components of the voltage regulator.

SUMMARY

A voltage regulator having an emulated ripple generator, substantially as shown in and/or described in connection with at least one of the figures, and as set forth more completely in the claims.

BRIEF DESCRIPTION OF THE DRAWINGS

FIG. 3 illustrates a schematic diagram of a circuit of an emulated ripple generator in accordance with one implementation.

DETAILED DESCRIPTION

Figure 1:
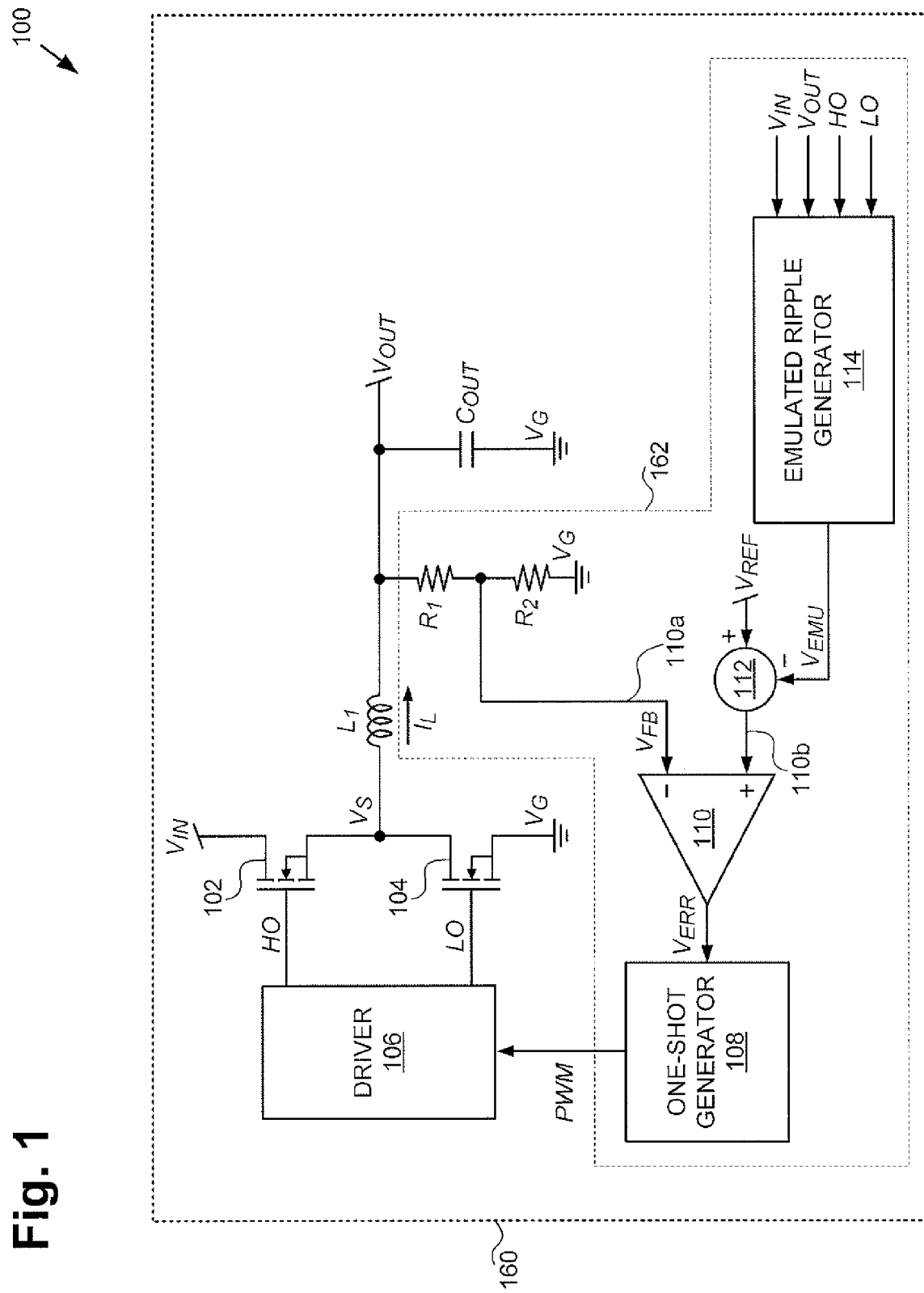
FIG. 1 illustrates a schematic diagram of a circuit of an exemplary voltage regulator having an emulated ripple generator in accordance with one implementation.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 illustrates a schematic diagram of a circuit of voltage regulator 100 having emulated ripple generator 114. Voltage regulator 100 includes high side power transistor 102, low side power transistor 104, driver 106, output inductor $L_I$, output capacitor $C_{OUT}$, and feedback loop 162. Feedback loop 162 includes resistors $R_1$ and $R_2$, one-shot generator 108, comparator 110, adder 112, and emulated ripple generator 114.

In voltage regulator 100, driver 106 provides high side control signal HO to a gate of high side power transistor 102 to drive high side power transistor 102. Driver 106 also provides low side control signal LO to a gate of low side power transistor 104 to drive low side power transistor 104. High side power transistor 102 and low side power transistor 104 are connected in totem pole configuration (i.e. half-bridge configuration) between high side input voltage $V_{IN}$ and ground voltage $V_G$ (or more generally between a high side voltage and a low side voltage). Driver 106 is configured to drive high side power transistor 102 and low side power transistor 104 to provide switching voltage $V_S$ to output inductor $L_I$. Output inductor $L_I$ provides output voltage $V_{OUT}$ to a load (not shown) through output capacitor $C_{OUT}$.

In voltage regulator 100, switching voltage $V_S$ induces ripple in inductor current $I_L$ of output inductor $L_I$, which manifests itself in output voltage $V_{OUT}$ due, largely, to equivalent series resistance (ESR) of output capacitor $C_{OUT}$.

A voltage regulator can typically regulate output voltage $V_{OUT}$ based on ripple in output voltage $V_{OUT}$, which is derived from inductor current $I_L$. However, in many applications, ripple in output voltage $V_{OUT}$ constitutes noise and should be minimized. One approach to minimizing ripple in output voltage $V_{OUT}$ would be to ensure that output capacitor $C_{OUT}$ has low equivalent series resistance (ESR). However, the voltage regulator is not stable when ripple in output voltage $V_{OUT}$ is small. As such, the voltage regulator cannot use a low ESR capacitor for output capacitor $C_{OUT}$. Some voltage regulators may operate stably when ripple in output voltage $V_{OUT}$ is small. However, these voltage regulators require a relatively constant series resistance of output inductor $L_I$ as well as additional components. These additional components must be external to an integrated circuit (IC) that houses remaining components of the voltage regulator.

In accordance with various implementations disclosed in the present application, voltage regulator 100 regulates output voltage $V_{OUT}$ based on emulated ripple $V_{EMU}$. Emulated ripple $V_{EMU}$ is substantially in-phase with inductor current $I_L$ of voltage regulator 100. Thus, voltage regulator 100 can regulate output voltage $V_{OUT}$ based on emulated ripple $V_{EMU}$ in place of ripple in output voltage $V_{OUT}$.

While emulated ripple $V_{EMU}$ corresponds to an emulated version of ripple in output voltage $V_{OUT}$, emulated ripple $V_{EMU}$ can have a magnitude that is larger than ripple in output voltage $V_{OUT}$. As such, ripple in output voltage $V_{OUT}$ can be small without introducing instability to voltage regulator 100. Thus, in some implementations, output capacitor $C_{OUT}$ is a ceramic capacitor, such as a multilayer chip type ceramic capacitor (MLCC), that is low cost and has low ESR. Additionally, because output capacitor $C_{OUT}$ can have low ESR, it can optionally be internal to IC 160 of voltage regulator 100. This can be achieved without requiring a relatively constant series resistance of output inductor $L_I$ as well as additional components for voltage regulator 100. As such, in some implementations, each constituent of voltage regulator 100, shown in FIG. 1, is on IC 160. Furthermore, IC 160 can have terminals (not shown in FIG. 1) for high side input voltage $V_{IN}$, output voltage $V_{OUT}$, and ground $V_G$. However, it is noted that any of the constituents of voltage regulator 100 can optionally be external to IC 160.

In the present implementation, voltage regulator 100 is a constant on-time (COT) regulator (e.g. a COT buck regulator). Driver 106 is configured to switch high side and low side power transistors 102 and 104 of voltage regulator 100 based on pulse with modulated signal (PWM) signal (more generally referred to as a "control signal") generated using emulated ripple generator 114 in feedback loop 162. PWM signal is generated using feedback signal $V_{FB}$, reference signal $V_{REF}$ and emulated ripple $V_{EMU}$.

Feedback signal $V_{FB}$ is derived from output voltage $V_{OUT}$ and is a stepped down version of output voltage $V_{OUT}$. Thus, feedback signal $V_{FB}$ is proportional to output voltage $V_{OUT}$. For example, voltage regulator 100 includes a resistor divider having resistors $R_1$ and $R_2$, which generates feedback signal $V_{FB}$ from output voltage $V_{OUT}$. However, feedback signal $V_{FB}$ can be generated from output voltage $V_{OUT}$ using other means. Emulated ripple $V_{EMU}$ is an emulated version of ripple in output voltage $V_{OUT}$. In voltage regulator 100, emulated ripple $V_{EMU}$ is generated by emulated ripple generator 114 utilizing high side input voltage $V_{IN}$, output voltage $V_{OUT}$, high side control signal HO, and low side control signal LO. Reference voltage $V_{REF}$ can, for example, be generated from high side input voltage $V_{IN}$.

Inverting input 110a and non-inverting input 110b of comparator 110 are based on feedback signal $V_{FB}$, reference signal $V_{REF}$ and emulated ripple $V_{EMU}$. In the implementation shown, feedback signal $V_{FB}$ is provided to inverting input 110a of comparator 110. Emulated ripple $V_{EMU}$ is subtracted from reference voltage $V_{REF}$ by adder 112, whose output is received by non-inverting input 110b of comparator 110.

Exemplary operation of voltage regulator 100 is described below. Comparator 110 is configured to provide error signal $V_{ERR}$ to one-shot generator 108 based on feedback signal $V_{FB}$, reference signal $V_{REF}$ and emulated ripple $V_{EMU}$. In some implementations, when feedback signal $V_{FB}$ is lower than a difference between reference signal $V_{REF}$ and emulated ripple $V_{EMU}$, error signal $V_{ERR}$ is high, and one-shot generator 108 can output PWM signal as high so that high side power transistor 102 is ON and low side power transistor 104 is OFF. Thus, while PWM signal is high, output voltage $V_{OUT}$ can rise so that feedback signal $V_{FB}$ is greater than a difference between reference signal $V_{REF}$ and emulated ripple $V_{EMU}$ causing error signal $V_{ERR}$ to be low. It is noted that in some implementations, PWM signal is subject to a minimum OFF time, which can be, for example, approximately 100 ns.

A timing circuit in one-shot generator 108 maintains PWM signal as high for a substantially constant on-time. It is noted that while voltage regulator 100 is referred to as a COT regulator, the substantially constant on-time can be an adaptive on-time, which may account for variation in high side input voltage $V_{IN}$ and/or output voltage $V_{OUT}$. After the substantially constant on-time, one-shot generator 108 can output PWM signal as low (based on at least error signal $V_{ERR}$ being low), so that high side power transistor 102 is OFF and low side power transistor 104 is ON. Thus, output voltage $V_{OUT}$ can fall so that feedback signal $V_{FB}$ is once again lower than a difference between reference signal $V_{REF}$ and emulated ripple $V_{EMU}$ causing error signal $V_{ERR}$ to be high thereby entering a new cycle.

Figure 2:
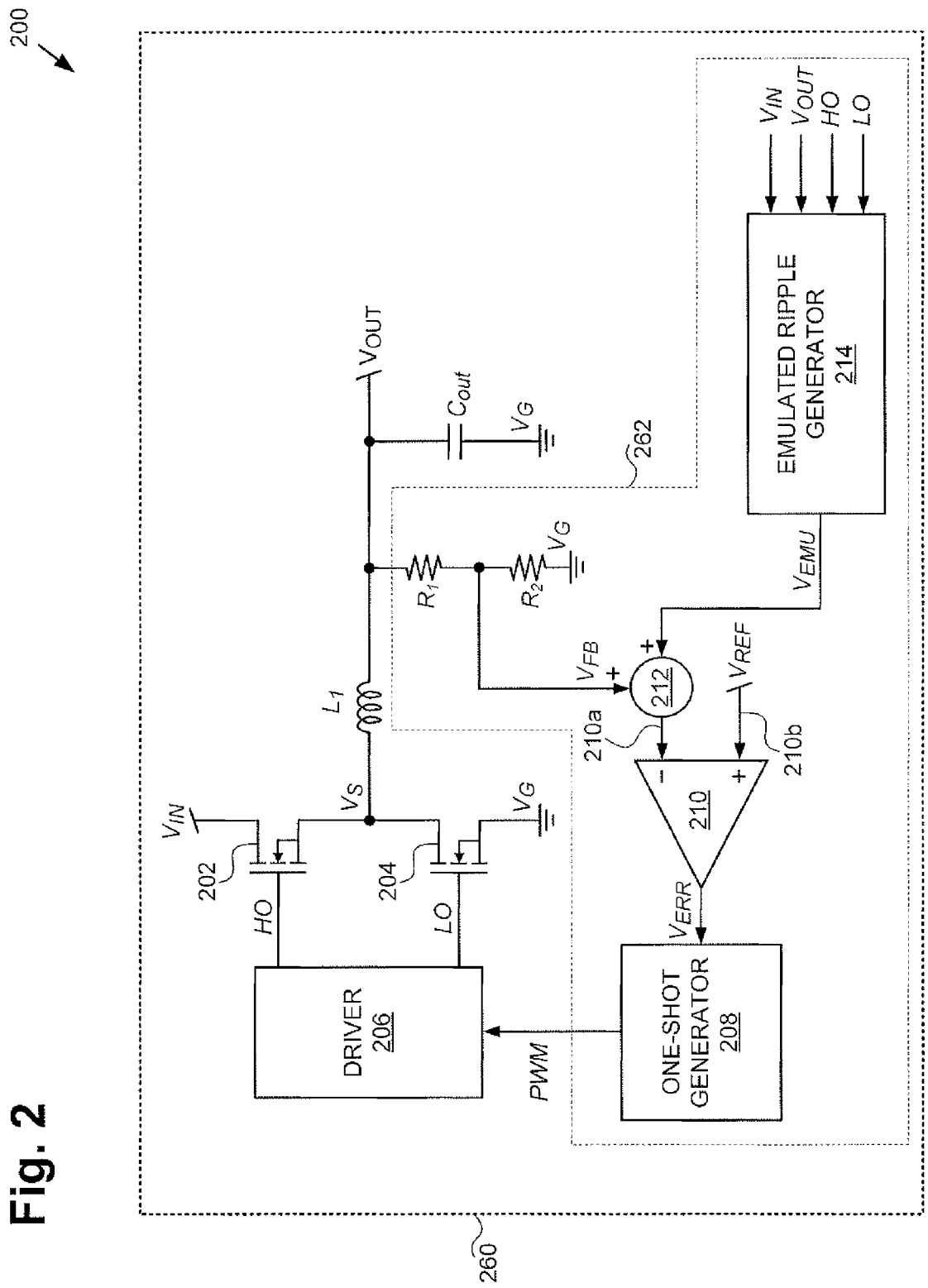
FIG. 2 illustrates a schematic diagram of a circuit of another exemplary voltage regulator having an emulated ripple generator in accordance with another implementation.

As described above, in the implementation shown in FIG. 1, emulated ripple $V_{EMU}$ is subtracted from reference voltage $V_{REF}$. However, in some implementations, emulated ripple $V_{EMU}$ is instead added to feedback signal $V_{FB}$. Referring now to FIG. 2, FIG. 2 illustrates a schematic diagram of a circuit of voltage regulator 200 having emulated ripple generator 214. Voltage regulator 200 includes high side power transistor 202, low side power transistor 204, driver 206, output inductor $L_I$, output capacitor $C_{OUT}$, feedback loop 262, and IC 260 corresponding respectively to high side power transistor 102, low side power transistor 104, driver 106, output inductor $L_I$, output capacitor $C_{OUT}$, feedback loop 162, and IC 160 in FIG. 1. In feedback loop 262, resistors $R_1$ and $R_2$, one-shot generator 208, comparator 210, adder 212, and emulated ripple generator 214 correspond respectively to resistors $R_1$ and $R_2$, one-shot generator 108, comparator 110, adder 112, and emulated ripple generator 114 in feedback loop 162.

As shown in FIG. 2, in voltage regulator 200, comparator 210 receives reference voltage $V_{REF}$ at non-inverting input 210b and receives a sum of feedback voltage $V_{FB}$ and emulated ripple $V_{EMU}$. Voltage regulator 200 is otherwise similar to voltage regulator 100 of FIG. 1.

Referring now to FIG. 3, FIG. 3 illustrates a schematic diagram of a circuit of emulated ripple generator 314, which can correspond to emulated ripple generator 114 in FIG. 1 and emulated ripple generator 214 in FIG. 2.

Emulated ripple generator 314 includes high side current source 320, low side current source 322, high side switch 324, low side switch 326, and emulator capacitor $C_{EMU}$. As shown in FIG. 3, emulator capacitor $C_{EMU}$ is coupled between emulated ripple $V_{EMU}$ and ground $V_G$. Emulator capacitor $C_{EMU}$, can be, for example, on the order of picofarads. In some implementations, emulator capacitor $C_{EMU}$ is less than approximately 10 picofarads. In certain implementations, emulator capacitor $C_{EMU}$ includes a trimmable capacitor. Emulator capacitor $C_{EMU}$ can be, as one example, a ceramic capacitor. However, emulator capacitor $C_{EMU}$ can be other types of capacitors and/or charge storage devices. In some implementations, emulator capacitor $C_{EMU}$ is on IC 160 of FIG. 1. In other implementations, emulator capacitor $C_{EMU}$ is external to IC 160 of FIG. 1.

Referring to FIG. 3 with FIG. 1, high side switch 324 and low side switch 326 are configured to control charging and discharging of emulated ripple $V_{EMU}$ such that emulated ripple $V_{EMU}$ is substantially in-phase with inductor current $I_L$ of voltage regulator 100. Thus, voltage regulator 100 can regulate output voltage $V_{OUT}$ based on emulated ripple $V_{EMU}$ as an alternative to ripple in output voltage $V_{OUT}$.

In the present example, high side switch 324 is configured to control charging of emulated ripple $V_{EMU}$ by selectively enabling high side current source 320. As shown in FIG. 3, high side switch 324 is configured to selectively couple high side current source 320 to emulator capacitor $C_{EMU}$ so as to selectively charge emulated ripple $V_{EMU}$. High side current source 320 is thereby configured to selectively charge emulated ripple $V_{EMU}$.

In voltage regulator 100, charging of emulated ripple $V_{EMU}$ is configured to be concurrent with high side power transistor 102 of voltage regulator 100, and more particularly, with high side power transistor 102 being ON. For example, as shown in FIG. 3, high side switch 324 is configured to control charging of emulated ripple $V_{EMU}$ responsive to high side control signal HO of for example, high side power transistor 102 of FIG. 1. High side switch 324 is thereby configured to connect high side current source 320 to emulator capacitor $C_{EMU}$ substantially concurrently with high side power transistor 102 being ON. High side switch 324 is further configured to disconnect high side current source 320 from emulator capacitor $C_{EMU}$ substantially concurrently with high side power transistor 102 being OFF.

In the present example, low side switch 326 is configured to control discharging of emulated ripple $V_{EMU}$ by selectively enabling low side current source 322. As shown in FIG. 3, low side switch 326 is configured to selectively couple low side current source 322 to emulator capacitor $C_{EMU}$ so as to selectively discharge emulated ripple $V_{EMU}$. Low side current source 322 is thereby configured to selectively discharge emulated ripple $V_{EMU}$.

In voltage regulator 100, discharging of emulated ripple $V_{EMU}$ is configured to be be concurrent with at least one of high side power transistor 102 and low side transistor 104 of voltage regulator 100. More particularly, discharging of emulated ripple $V_{EMU}$ is configured to be while at least one of high side power transistor 102 and low side transistor 104 of voltage regulator 100 is ON. For example, as shown in FIG. 3, low side switch 326 is configured to control discharging of emulated ripple $V_{EMU}$ responsive to high side control signal HO of, for example, high side power transistor 102 of FIG. 1 and low side control signal LO of, for example, low side power transistor 104 of FIG. 1. Low side switch 326 is configured to connect low side current source 322 to emulator capacitor $C_{EMU}$ substantially concurrently with high side power transistor 102 being ON or low side power transistor 104 being ON. Low side switch 326 is further configured to disconnect low side current source 322 from emulator capacitor $C_{EMU}$ substantially concurrently with both high side power transistor 102 and low side power transistor 104 being OFF.

Emulated ripple generator 314 is configured so that emulated ripple $V_{EMU}$ has a rising slope approximately equal to a rising slope of ripple in inductor current $I_L$ when high side power transistor 102 is ON and low side power transistor 104 is OFF. Furthermore, emulated ripple generator 314 is also configured so that emulated ripple $V_{EMU}$ has a falling slope approximately equal to a falling slope of ripple in inductor current $I_L$ when low side power transistor 104 is ON and high side power transistor 102 is OFF. Thus, voltage regulator 100, for example, can regulate output voltage $V_{OUT}$ based on emulated ripple $V_{EMU}$ (e.g. based on a scaled version of emulated ripple $V_{EMU}$) instead of based on ripple in output voltage $V_{OUT}$. As such, ripple in output voltage $V_{OUT}$ can be small without introducing instability into voltage regulator 100.

In further detail of the present implementation, when high side power transistor 102 is ON and low side power transistor 104 is OFF, ripple in inductor current $I_L$ has a rising slope approximately equal to (high side input voltage $V_{IN}$– output voltage $V_{OUT}$)/L, where L is the inductance of output inductor $L_I$. When low side power transistor 104 is ON and high side power transistor 102 is OFF, ripple in inductor current $I_L$ has a falling slope approximately equal to (–output voltage $V_{OUT}$)/L.

In the present implementation, in emulated ripple generator 314, high side current source 320 is proportional to high side input voltage $V_{IN}$ (e.g. high side input voltage $V_{IN}$ multiplied by constant k). Thus, charging of emulated ripple $V_{EMU}$ is proportional to high side input voltage $V_{IN}$ of voltage regulator 100. Also, low side current source 322 is proportional to output voltage $V_{OUT}$ (e.g. output voltage $V_{OUT}$ multiplied by constant k). Thus, discharging of emulated voltage $V_{EMU}$ is proportional to output voltage $V_{OUT}$ of voltage regulator 100. As such, when high side power transistor 102 is ON and low side power transistor 104 is OFF, emulated ripple $V_{EMU}$ has a rising slope approximately equal to $k/C_{EMU}$*(high side input voltage $V_{IN}$–output voltage $V_{OUT}$). Also, when low side power transistor 104 is ON and high side power transistor 102 is OFF, emulated ripple $V_{EMU}$ has a falling slope approximately equal to $k/C_{EMU}$* (–output voltage $V_{OUT}$). Thus, constant k and emulator capacitor $C_{EMU}$ can be selected so that the rising slope of $V_{EMU}$ is approximately equal (or proportional) to the rising slope of ripple in inductor current $I_L$ and the falling slope of $V_{EMU}$ is approximately equal (or proportional) to the falling slope of ripple in inductor current $I_L$. Constant k can be selected to adjust the amplitude of emulated ripple $V_{EMU}$ and can be, for example, greater than 1. Thus, emulated ripple $V_{EMU}$ can have a larger amplitude than ripple in output voltage $V_{OUT}$. The amplitude of emulated ripple $V_{EMU}$ can be adjusted and/or selected so as to optimize the performance (e.g. the stability and transient response) of voltage regulator 100.

Utilizing emulated ripple generator 314, emulated ripple $V_{EMU}$ can correspond to ripple in inductor current $I_L$, throughout various modes of operation of voltage regulator 100. For example, emulated ripple $V_{EMU}$ can correspond to ripple in inductor current $I_L$ in implementations having discontinuous conduction mode, for example, where high side power transistor 102 and low side power transistor 104 are both OFF.

In some implementations, emulated ripple generator 314 does not utilize at least one of high side input voltage $V_{IN}$ and output voltage $V_{OUT}$ to generate emulated ripple $V_{EMU}$. However, by generating high side current source 320 from high side input voltage $V_{IN}$ and low side current source 322 from output voltage $V_{OUT}$, emulated ripple $V_{EMU}$ can be made to easily correspond to ripple in inductor current $I_L$ throughout variations in high side input voltage $V_{IN}$ and output voltage $V_{OUT}$.

In FIG. 3, emulated ripple generator 314 includes additional optional features. For example, emulated ripple generator 314 includes bleeding resistor $R_B$. Bleeding resistor $R_B$ ensures that an average voltage does not build up across emulator capacitor $C_{EMU}$. Emulated ripple generator 314 also includes one-shot generator 328 controlling one-shot switch 330 based on high side control signal HO. One-shot generator 328 and one-shot switch 330 are configured to discharge emulator capacitor $C_{EMU}$ so that transient DC voltage is not generated across emulator capacitor $C_{EMU}$. At the beginning of each cycle, for example, one-shot generator 328 and one-shot switch 330 can discharge capacitor $C_{EMU}$ so emulator capacitor $C_{EMU}$ starts from zero (in implementations where emulator capacitor $C_{EMU}$ should start from zero). In addition, emulated ripple generator 314 includes clamping diode $D_C$ to prevent emulated ripple $V_{EMU}$ from going negative (in implementations where emulator capacitor $C_{EMU}$ should not go negative). However, it is noted that in some implementations, emulated ripple $V_{EMU}$ can be negative (e.g. in a different type of ripple regulator than what is shown in the exemplary implementations).

Thus, as described above with respect to FIGS. 1, 2, and 3, and related discussion, various implementations can provide for a voltage regulator, which can regulate output voltage based on an emulated ripple of the output voltage. As such, the voltage regulator may be freed from various constraints that may otherwise be imposed by regulation utilizing ripple in the output voltage. For example, the voltage regulator may utilize an output capacitor having a low ESR without including additional components to the voltage regulator. As such, the voltage regulator may be provided at reduced cost and may be implemented on a single IC.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

The invention claimed is:

1. A voltage regulator comprising an emulated ripple generator in a feedback loop;
   said emulated ripple generator comprising:
      a high side switch configured to control charging of an emulated ripple, wherein said charging is configured to be concurrent with a high side power transistor of said voltage regulator being ON;
      a low side switch configured to control discharging of said emulated ripple, wherein said discharging is configured to be concurrent with said high side power transistor of said voltage regulator being ON and wherein said discharging is further configured to be concurrent with a low side power transistor of said voltage regulator being ON;
      said high side switch and said low side switch configured to control said charging and said discharging such that said emulated ripple is substantially in-phase with an inductor current of said voltage regulator; and
      a one-shot switch in parallel with an emulator capacitor, and configured to discharge said emulator capacitor approximately at the beginning of a cycle;
   said feedback loop comprising:
      a feedback signal generated from an output of said voltage regulator; and
      a comparator configured to receive a sum of said feedback signal and said emulated ripple, and to generate an error signal based on said sum.

2. The voltage regulator of claim 1, wherein said charging is proportional to a high side input voltage of said voltage regulator.

3. The voltage regulator of claim 1, wherein said high side switch is configured to control said charging by selectively enabling a high side current source.

4. The voltage regulator of claim 1, wherein said discharging is proportional to an output voltage of said voltage regulator.

5. The voltage regulator of claim 1, wherein said low side switch is configured to control said discharging by selectively enabling a low side current source.

6. The voltage regulator of claim 1, wherein said voltage regulator is a constant on-time buck regulator.

7. A voltage regulator comprising:
   a driver configured to switch high side and low side power transistors of said voltage regulator based on a control signal generated using an emulated ripple generator in a feedback loop;
   wherein said emulated ripple generator comprises:
      a high side switch configured to control charging of an emulated ripple, wherein said charging is configured to be concurrent with said high side power transistor of said voltage regulator being ON;
      a low side switch configured to control discharging of said emulated ripple, wherein said discharging is configured to be concurrent with said high side power transistor of said voltage regulator being ON and wherein said discharging is further configured to be concurrent with said low side power transistor of said voltage regulator being ON;
      said high side switch and said low side switch configured to control said charging and said discharging such that said emulated ripple is substantially in-phase with an inductor current of said voltage regulator; and
      a one-shot switch in parallel with an emulator capacitor, and configured to discharge said emulator capacitor approximately at the beginning of a cycle;
   wherein said feedback loop comprises:
      a feedback signal generated from an output of said voltage regulator; and
      a comparator configured to receive a sum of said feedback signal and said emulated ripple, and to generate an error signal based on said sum;
   said control signal being generated using said error signal.

8. The voltage regulator of claim 7, wherein said charging is proportional to a high side input voltage of said voltage regulator.

9. The voltage regulator of claim 7, wherein said high side switch is configured to control said charging by selectively enabling a high side current source.

10. The voltage regulator of claim 7, wherein said discharging is proportional to an output voltage of said voltage regulator.

11. The voltage regulator of claim 7, wherein said low side switch is configured to control said discharging by selectively enabling a low side current source.

12. The voltage regulator of claim 7, wherein said high side switch is configured to control said charging responsive to a high side control signal of said high side power transistor.

13. The voltage regulator of claim 7, wherein said low side switch is configured to control said discharging responsive to a high side control signal of said high side power transistor and a low side control signal of said low side power transistor.

14. A voltage regulator comprising an emulated ripple generator in a feedback loop;
   said emulated ripple generator comprising:
      a high side current source configured to selectively charge an emulated ripple;
      a low side current source configured to selectively discharge said emulated ripple; and
      said high side current source configured to charge said emulated ripple concurrently with a high side power transistor of said voltage regulator being ON, said low side current source configured to discharge said emulated ripple concurrently with said high side power transistor of said voltage regulator being ON, and said low side current source being further configured to discharge said emulated ripple concurrently with a low side power transistor of said voltage regulator being ON;
      a one-shot switch in parallel with an emulator capacitor, and configured to discharge said emulator capacitor approximately at the beginning of a cycle;
   said feedback loop comprising:
      a feedback signal generated from an output of said voltage regulator; and a comparator configured to receive a sum of said feedback signal and said emulated ripple, and to generate an error signal based on said sum.

15. The voltage regulator of claim 14, wherein said high side current source is proportional to a high side input voltage of said voltage regulator.

16. The voltage regulator of claim 14, wherein said low side current source is proportional to an output voltage of said voltage regulator.

17. The voltage regulator of claim 14, comprising a high side switch configured to selectively couple said high side current source to said emulator capacitor so as to selectively charge said emulated ripple.

18. The voltage regulator of claim 14, comprising a low side switch configured to selectively couple said low side current source to said emulator capacitor so as to selectively discharge said emulated ripple.

\* \* \* \* \*